United States Patent [19]
Chliwnyj et al.

[11] Patent Number: 5,828,514
[45] Date of Patent: Oct. 27, 1998

[54] SERVO ERROR DETECTION IN A NOISY ENVIRONMENT

[75] Inventors: Alex Chliwnyj; Steven Carter Wills, both of Tucson, Ariz.

[73] Assignee: International Business Machines Corporation, Armonk, N.Y.

[21] Appl. No.: 600,914

[22] Filed: Feb. 16, 1996

[51] Int. Cl.⁶ .................................................. G11B 5/584
[52] U.S. Cl. ........................... 360/77.12; 360/53; 360/60
[58] Field of Search .................................. 360/77.12, 53, 360/60, 78.02, 75

[56] References Cited

U.S. PATENT DOCUMENTS

| | | |
|---|---|---|
| 4,432,026 | 2/1984 | Coleman, Jr. . |
| 5,003,413 | 3/1991 | Miyazaki . |
| 5,089,757 | 2/1992 | Wilson . |
| 5,235,472 | 8/1993 | Smith ........................................ 360/60 |
| 5,258,879 | 11/1993 | Shimotashiro et al. . |
| 5,309,299 | 5/1994 | Crossland et al. . |
| 5,394,280 | 2/1995 | Chliwnyj et al. ..................... 360/77.12 |
| 5,574,602 | 11/1996 | Baca et al. ............................ 360/77.12 |

Primary Examiner—Aristotelis M. Psitos
Assistant Examiner—James L. Habermehl
Attorney, Agent, or Firm—R. M. Sullivan

[57] ABSTRACT

An improved and apparatus is provided in a tape drive for servo-controlling a tape head position relative to a magnetic tape as the magnetic tape travels past the tape head thereby reducing track mis-registration on the magnetic tape. Servo elements contained within the tape head detect a lateral displacement of the magnetic tape position relative to the tape head and generate position error signals corresponding to such lateral displacement. The position error signals are then filtered to generate a low frequency position error signal, a midrange frequency error signal, and position reliability signals. The tape head is then positioned by a head actuator according to the low frequency position error signal to adjust to the lateral movement of the magnetic tape. The midrange frequency error signal is compared to a distortion threshold to determine if errors exist due to tape edge vibrations or distortion of the magnetic tape. The position reliability signals are used to calculate an error density, which is then compared to a surface threshold to determine whether a surface defect exists on the magnetic tape.

19 Claims, 8 Drawing Sheets

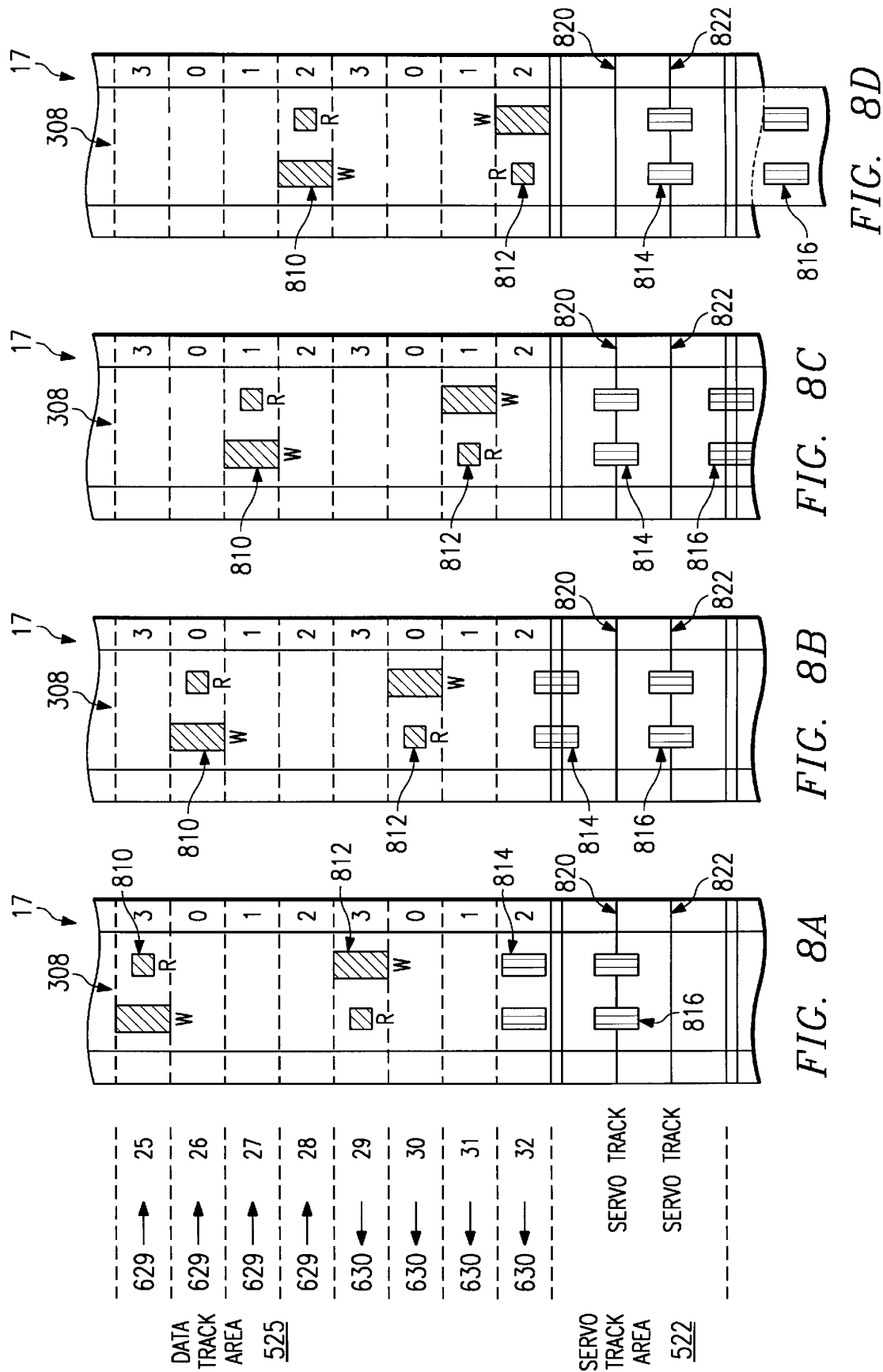

SERVO ERROR DETECTION IN A NOISY ENVIRONMENT

FIELD OF THE INVENTION

The present invention relates generally to tape drives, which process data on a magnetic tape by passing a magnetic alongside a tape head. More particularly, the present invention describes an improved servo system for controlling the position of the tape head relative to the magnetic tape.

BACKGROUND OF THE INVENTION

Data processing systems typically require a large amount of data storage. Effective data processing systems efficiently access, modify, and re-store data within the data storage. Data storage is typically provided in several different mediums, each medium characterized by the time to access the data and the cost to store the data. A first medium of data storage involves electronic memory, usually dynamic or static random access memory (DRAM or SRAM). Electronic memories take the form of semiconductor integrated circuits wherein millions of bytes of data can be stored on each circuit, with access to such bytes of data measured in nanoseconds. The electronic memory provides the fastest access to data since such access is accomplished at electronic speeds.

A second medium of data storage involves direct access storage devices (DASD). DASD storage, for example, can comprise magnetic and/or optical disks. The disks are rotatably mounted within a protected environment and data bits are stored as micrometer sized magnetically or optically altered spots on a disk surface. Each disk is divided into many concentric tracks, or closely spaced circles. The data is stored serially, bit by bit, along each track. Each DASD contains an access mechanism, known as a head disk assembly (HDA), which typically includes one or more read/write heads. The HDA moves across the tracks to transfer the data to and from the surface of the disks as the disks are rotated past the read/write heads. DASDs can store gigabytes of data with the access to such data typically measured in milliseconds (orders of magnitudes slower than electronic memory). Access to data stored on DASD is slower due to the need to physically position the disk and HDA to the desired data storage location.

A third medium of data storage includes tapes, tape libraries, and optical libraries. Access to data is much slower in a library since a robot is needed to select and load the data storage cartridge. An advantage of these storage systems is the reduced cost for very large data storage capabilities, on the order of terabytes of data. For example, gigabytes of data can be stored within an individual magnetic tape cartridge. Tape storage is often used for back-up purposes. That is, data stored on a different storage medium, such as DASD, is reproduced for safe keeping on magnetic tape. Access to data stored on tape and/or in a library is presently on the order of seconds.

Having a back-up data copy is mandatory for many businesses since a data loss could be catastrophic to the business. A large volume of back-up data, such as terabytes of data, is generally stored in a tape library. The library accesses data by using a robotic mechanism to select a tape cartridge from an array of storage bins. Once the tape cartridge is loaded into a tape drive within the library, data can be read from or written to the tape cartridge. Increasing the data capacity that can be stored to tape reduces the cost of backing up data and improves library efficiency.

In the information storage industry, increases in tape data capacities have been achieved, in part, by increasing tape lengths stored within a cartridge or reel. Increased tape length has been mainly accomplished by producing thinner tape substrates. Additional increases in data capacity are made possible by various data compression techniques, for example, Improved Data Recording Capability (IDRC) by International Business Machines, Company, or Lempel-Ziv data compression by Stac Electronics, Inc. Data compression techniques can increase data density by two to five times over non-compressed data.

Advances in magnetic tape media and tape head technologies have generated further increases in data capacity by increasing both a number of tracks on a magnetic tape (by narrowing a width of each track) and the number of read/write elements on the tape head. An eighteen-track tape for data storage has been a standard for many years. More recently, an IBM 3490-E magnetic tape subsystem for 12.7 mm (½ inch) wide tape employs a head element with thirty-six read/write elements and has a tape capacity of 800 megabytes. Data compression techniques can increase the tape capacity to two or more gigabytes. The 3490-E magnetic tape subsystem performs bi-directional linear recording, as opposed to helical scan recording.

A number of tape rewinds is reduced, and performance improved accordingly, by interleaving sets of head elements. In an interleaved head, element pairs having a read-element/write-element configuration (when viewed towards the face of the head) alternate with element pairs having an opposite write-element/read-element configuration, each pair of elements being associated with one track on the tape. When the tape travels in a first direction, the element pairs having one configuration access the corresponding tracks (such as the even numbered tracks) in a read-after-write manner. Conversely, when the tape travels in an opposite direction, those element pairs having the other configuration access the other corresponding tracks (such as the odd numbered tracks), also in a read-after-write manner. To further enhance performance, this interleaved head element configuration can be combined with the large number of tracks along the tape. This combination requires an equally large number of closely spaced elements. The 3490-E tape head is such a head with a magneto-resistive transducer formed through thin film deposition techniques.

Historically, the number of tracks that could be established on the tape media has been limited by a number of corresponding elements that could be fabricated on a tape head. As a result, tape drives have been designed to process a tape using a head having fewer sets of read/write elements than a number of tracks on the tape. The tracks are divided into groups, each group containing a same number of tracks as there are read/write element pairs in the head. Accessing all the groups requires indexing the head transversely relative to the tape path, such as with a stepper motor or voice coil driven springs, into a number of discrete positions corresponding to the number of groups of tracks. A head having eight read/write pairs can accommodate a tape having thirty-two tracks if the tracks are divided into four groups of eight tracks each and the head has four index positions. A distance the head travels between index positions is minimized by interleaving the groups. For example, each of the four groups containing eight tracks (consecutively numbered 0–31) results in tracks 0, 4, 8, . . . , and 28 being in the first group and accessible by the head being indexed to position zero. Similarly, tracks 1, 5, 9, . . . , and 29 are in the second group, accessible in index position one; tracks 2, 6, 10, . . . , and 30 are in the third group, accessible in index position two; and tracks 3, 7, 11, . . . , and 31 are in the fourth group, accessible in index position three.

Despite advances in data capacity, still further increases are desired, such as would be possible with a 12.7 mm wide tape having 64 or even 128 tracks. However, even when a head is indexed, there is a practical limit to the ability of a multi-track head to accurately and reliably record data to and read data from a tape having such a large number of very narrow tracks. Problems can be caused by track mis-registrations, such as tape edge variations, environmental thermal expansion and contraction and inaccuracies in the path the tape follows in a drive, as well as by inaccuracies in the formatting of tracks on the tape itself. Even a minute "wobble" in the tape can result in significant signal degradation, such as crosstalk or dropout, since a 12.7 mm tape with 128 tracks would correspond to a track width of about eighty microns.

Using fixed heads, as in the past, made it easier to deal with track mis-registrations, etc. Now, however, not only are the tracks narrower, but the head is servo-controlled. Thus the head must appear fixed in terms of a home position, while providing excellent accuracy while servoing across track groups. Hence, very accurate head-to-tape path adjustments are required. These adjustments include track registration, penetration, yaw and azimuth. The servo-controlled head must not only be isolated from external shock and vibrations which could cause resonances, and hence track mis-registration, but also must be immune to resonances caused by its own servo-induced motion.

In addition, advanced tape head designs separate the write element from the read element to allow an immediate read check of the data written to a data track on the magnetic tape. The servo element also follows the write element when detecting minor adjustments in the magnetic tape position relative to the tape head. This spatial separation between the write element and the read and servo elements can compound track mis-registration at certain frequencies of tape movement. Since the tape head processes data on the magnetic tape in both a forward and reverse direction, the spatial separation between the write element and the servo element can cause the write element to be positioned at a greater offset from the nominal track position, effectively squeezing data tracks together and increasing the chance of track mis-registration.

Accordingly, it is desired to provide an improved method and apparatus for servo-controlling a tape head such that the tape head remains aligned with a passing magnetic tape thereby reducing track mis-registration along a written data track on the magnetic tape.

SUMMARY OF THE INVENTION

An object of the present invention is to provide an improved servo system for controlling a tape head position relative to a magnetic tape passing by the tape head thereby reducing tape mis-registration.

Another object of the present invention is to provide a tape device including an improved servo system for controlling a tape head position relative to a magnetic tape passing by the tape head thereby reducing tape mis-registration.

According to a first embodiment of the present invention, a method in a tape drive is provided for servo-controlling a tape head such that the tape head remains aligned with a passing magnetic tape. The tape head position is first maintained fixed relative to any movements of the tape drive frame. In addition, a lateral position adjustment of the magnetic tape relative to the tape head is detected by a servo element pair contained within the tape head as the magnetic tape travels past the tape head. This lateral position adjustment is then converted into position error signals. The position error signals are then filtered to generate both a filtered position error signal and position reliability signals. The tape head is then positioned by the actuator according to the filtered position error signal to adjust to the lateral movement of the magnetic tape. The position reliability signals are used to calculate an error density, which is then compared to a threshold to determine whether a surface defect exists on the magnetic tape.

In another embodiment of the present invention, a servo system is provided in a tape drive for controlling a tape head such that the tape head remains aligned with a passing magnetic tape. A position sensor is connected to the tape drive frame to maintain the tape head position relative to the frame. The position sensor detects any movements of the the tape head and allows a head actuator within the tape drive to adjust the tape head to such frame movements. The tape head contains servo elements for detecting a lateral position adjustment of the magnetic tape relative to the tape head as the magnetic tape travels by the tape head. The servo elements convert the lateral position adjustment into position error signals. A first filter generates a filtered position error signal from the position error signals. The actuator then positions the tape head according to the filtered position error signal. A second filter detects error signals due to tape distortion and tape edge vibration. A third filter generates a position reliability signal from each position error signal and calculates an error density. The error density is then compared to a threshold to determine whether a surface defect exists on the magnetic tape.

The foregoing and other objects, features, and advantages of the invention will be apparent from the following more particular description of a preferred embodiment of the invention, as illustrated in the accompanying drawing.

DESCRIPTION OF THE FIGURES

FIG. 8A through 8D illustrates a four position servo system for selecting one of four groups of tracks to be accessed in the magnetic tape format shown in FIG. 5.

DETAILED DESCRIPTION

Figure 1:
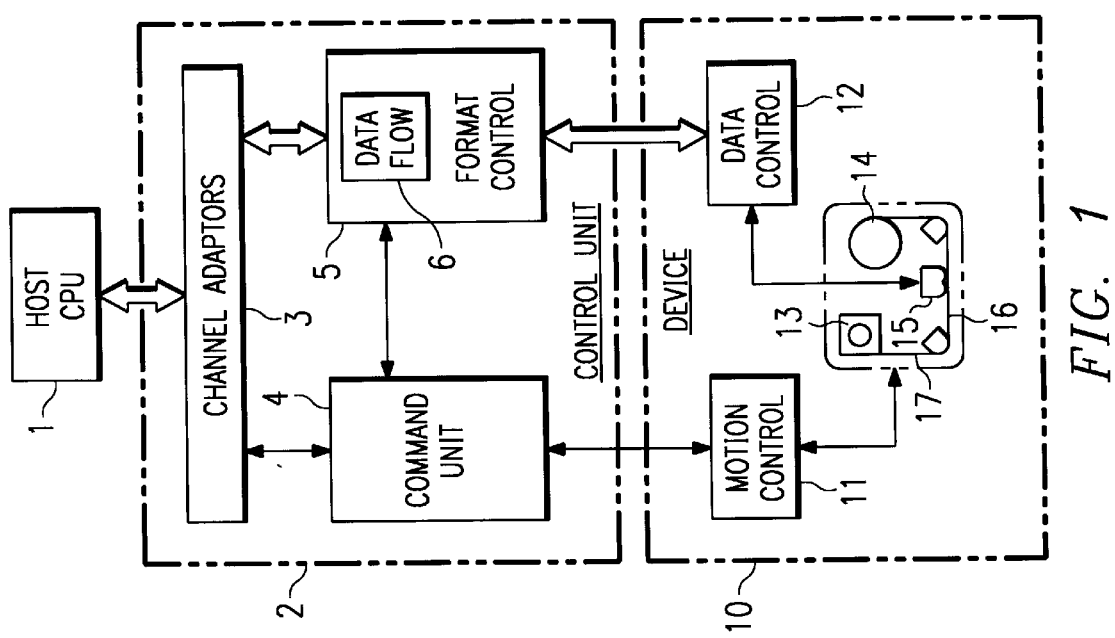
FIG. 1 is a schematic block diagram of a tape system embodying the invention.

Referring more particularly to the drawing, like numerals denote like features and structural elements in the various figures. The invention will be described as embodied in a magnetic tape drive for use in a data processing environment. Turning now to FIG. 1, a data processing system is controlled by at least one host central processing unit (CPU) 1, such as an IBM System/370 or IBM Enterprise Systems/9000 (ES/9000), to store, retrieve, and manipulate data. The data processing system includes one or more storage subsystems, including at least one tape system. The tape system further includes at least one control unit 2 and at least one magnetic tape recording or playback device 10. The control unit 2 accepts commands and data from the CPU 1 via one or more channel adapters 3, and controls the device(s) 10 accordingly. The control unit 2 and the device 10 may be physically separate or packaged together. Still further, the channel adapters 3 can be replaced by the well known small computer standard interface (SCSI). The device 10 may be an IBM tape drive (for example, an IBM 3490-E tape drive) which uses a predefined data format.

The device 10 includes a motion control 11 for controlling the handling of magnetic tape media, a data control 12 including read and write circuits to operate a magnetic transducing head 15 (hereinafter referred to as tape head 15), and a tape path 16 (including a tape cartridge 13 having tape take-up/supply reels 14 therein) for transporting a magnetic tape 17 past the head 15 for writing data to and reading data from the magnetic tape 17. The data control 12 is connected to a format control 5 in the control unit 2, which is in turn connected to the channel adapters 3. Format control 5 further includes a data flow 6 which, among other things, detects End of Block (EOB) marks located on the magnetic tape 17.

The motion control 11 is connected to a command unit 4 in the control unit 2, which command unit 4 is also connected to the channel adapters 3. The command unit 4 accepts commands from the CPU 1 via the channel adapters 3 and controls the mechanical operation of the device 10. The command unit 4 further controls the flow of data between the channel adapters 3 and the magnetic tape 17 via format control 5 and the data control 12.

Figure 2:
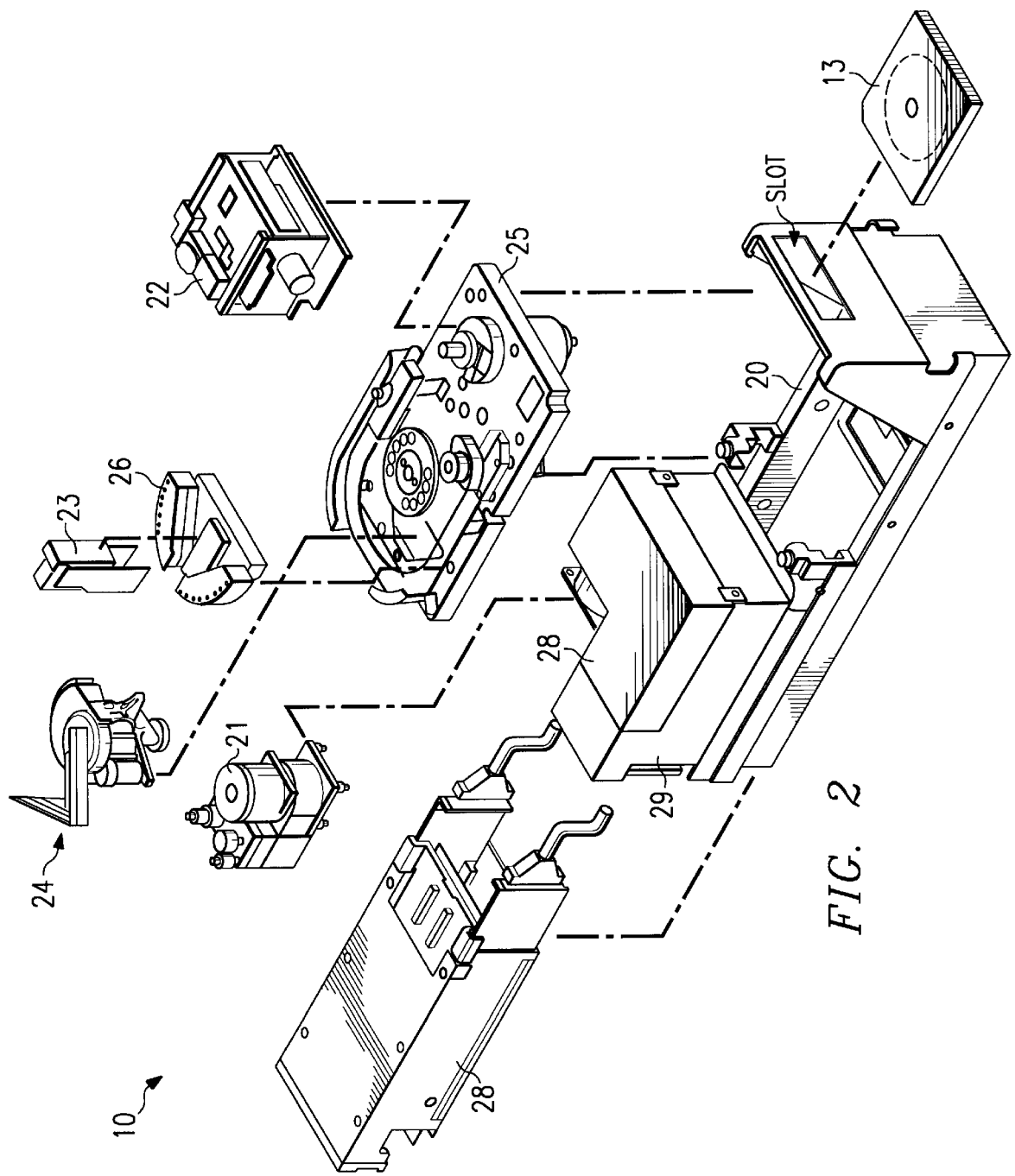
FIG. 2 is an exploded view of a magnetic tape drive according to a preferred embodiment of the present invention.

FIG. 2 illustrates an exploded view of an exemplary magnetic tape drive (device 10) in which the present invention may be incorporated. The device 10 includes a base unit 20 to which are mounted a power supply 29, various electronic circuit cards 28 (such as motion control 11 and data control 12), a deck assembly 25 and a pneumatic assembly 21. Mounted to the deck assembly 25 are a loader mechanism 22, drive motors (not specifically indicated), a pantocam assembly 24, and a "D" bearing assembly 26 (hereinafter referred to as the head guide assembly 26). A head actuator assembly 23 is mounted to the head guide assembly 26. The device 10 can operate in stand alone and automated tape loader environments interconnected with a host computer and can also be incorporated into a multi-drive automated data storage and retrieval system (library).

In operation, a removable tape cartridge 13 having a supply reel wound with magnetic tape 17 is inserted through a slot in a front face of the base unit 20 and into the loader assembly 22. The loader assembly 22 draws the tape cartridge 13 in and lowers the tape cartridge 13 onto the deck assembly 25. The pantocam assembly 24 engages a leader block attached to a free end of the magnetic tape 17 and pulls the magnetic tape around the head guide assembly 26 such that the magnetic tape 17 lays in the tape path 16 (FIG. 1) and across the magnetic tape head 15 mounted to the head actuator assembly 23. The leader block is then engaged by the take-up reel 14 (FIG. 1) on the deck assembly 25 and the device 10 is then ready to record information to or read information from the magnetic tape 17. While the device 10 illustrated in FIG. 2 includes a take-up reel and accepts tape cartridges containing only the supply reel, the present invention is not limited to use with such a drive/cartridge combination but could also be incorporated in other drive/cartridge combinations, such as those in which the tape cartridge contains both supply and take-up reels.

Figure 3:
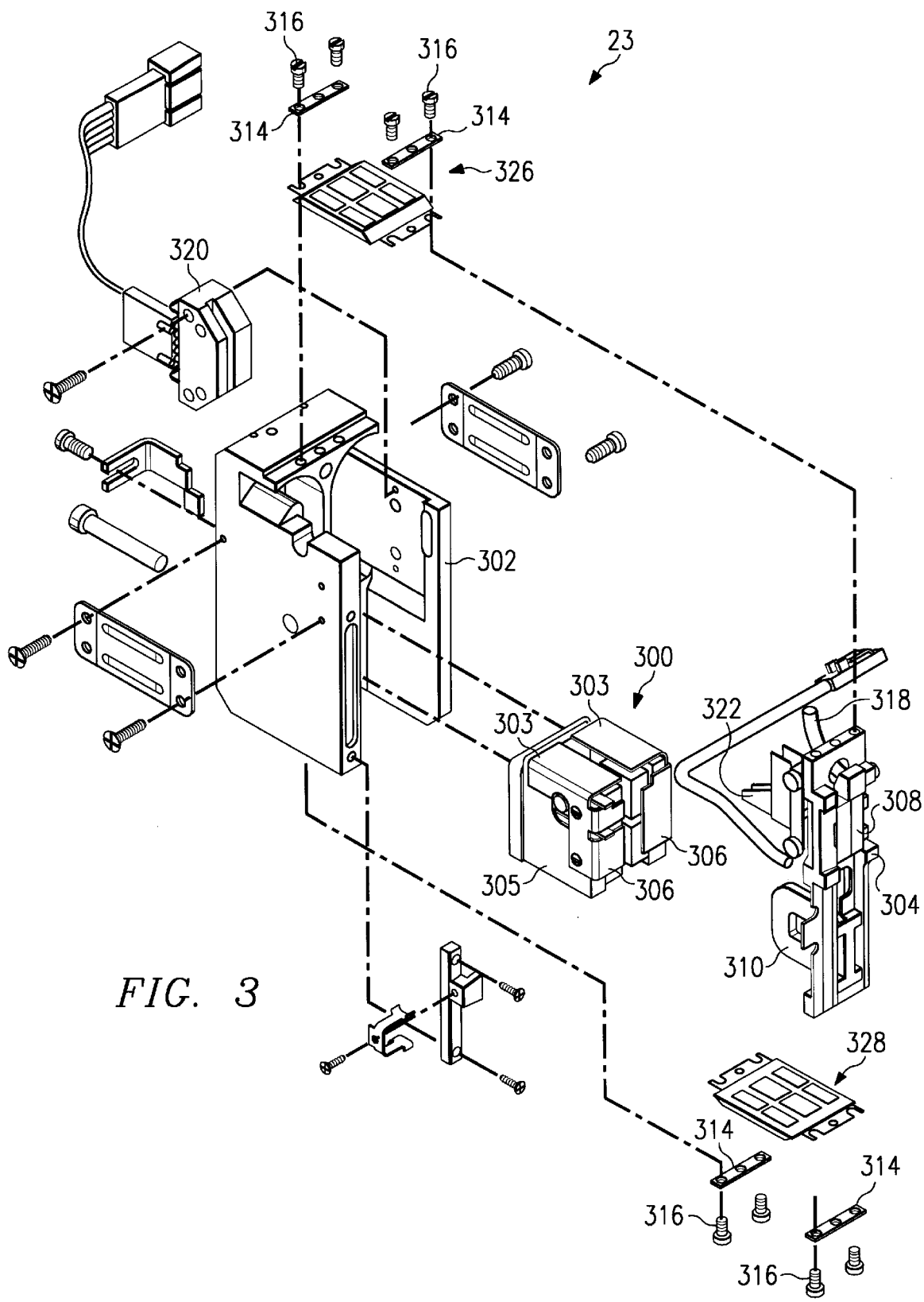
FIG. 3 is an exploded view of the elements of the head actuator assembly according to a preferred embodiment of the present invention.

FIG. 3 is an exploded view of elements making up the head actuator assembly 23. The head actuator assembly 23 includes a base member 302, a beam member 304, and a magnetic assembly 300 made up of a plurality of permanent magnets mounted to the base member 302. The electromagnetic assembly 300 includes a keeper 305 and one or more magnets 303. Fastened to the beam member 304, but located between the magnets 303 within a magnetic field produced thereby, is a substantially flat electrical coil 310 (as opposed to a cylindrical voice coil coaxial with a yoke). Mounted to an outer surface of the beam 304 is a multi-track magneto-resistive (MR) transducer 308 (hereinafter referred to as head 308). Interconnecting upper and lower ends of the beam 304 with upper and lower portions of the base member 302 are parallel upper and lower flexures 326 and 328, respectively, secured with brackets 314 and screws 316 (although alternative mounting methods can also be used). The beam member 304 is thus suspended away from the base member 302.

A hose 318 is secured to the beam member 304 to provide air to outlets in the head 308 as a "puffer" device to lift the magnetic tape away from the head 308, thus preventing the magnetic tape 17 from sticking to the head 308 during fast forward and rewind operations. Also preferably incorporated into the actuator assembly 23 is an optical tachometer to provide beam position feedback to the control unit 2 (FIG. 1) during head 308 indexing. The optical tachometer includes an optical sensor 320 mounted to the base member 302 and an associated indexing strip 322 positioned through a slot in the optical sensor 320 and which is mounted to, and moves with, the beam member 304.

Figure 4:
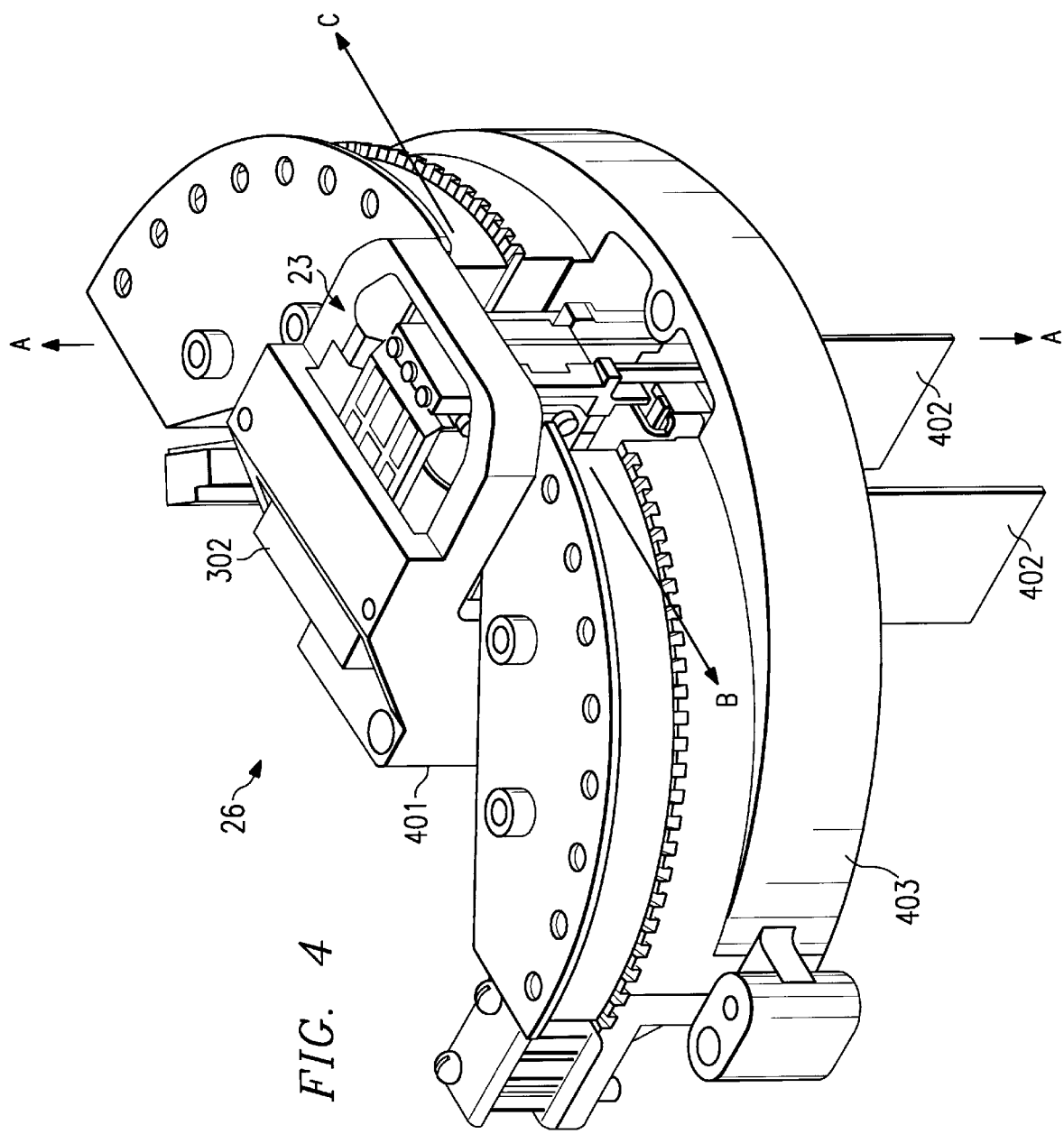
FIG. 4 is a perspective view of a head guide assembly having the head actuator assembly mounted therein according to a preferred embodiment of the present invention.

FIG. 4 depicts the head guide assembly 26 with the actuator assembly 23 secured to the base member 302, the base member 302 further coupled to a head guide support 403. Various brackets and screws secure the elements of the actuator assembly 23 together and various cables (including ribbon cables 402 for the head 308) interconnect the head 308, the coil 310 and the optical sensor 320 with the circuit cards 28 of the device 10. To reduce mechanical interference by the ribbon cables 402 with proper motion of the beam member 304, the ribbon cables 402 are preferably guided upwards along the sides of the beam member 304 and outwardly from the base member 302 by winged surfaces 322 inside the beam member 304 (FIG. 3).

In operation, when it is desired to access a particular set of tracks on the magnetic tape 17, the motion control 11 (FIG. 1) supplies a current to the coil 310. An electromagnetic field induced by the coil 310 interacts with the magnetic field of the magnets 303 to generate a force opposing a bias of the flexures 326 and 327 tending to maintain the beam member 304 in a primary position. The force urges the beam member 304, to which the coil 310 is secured, to move transversely along an axis A—A (FIG. 4) relative to the tape path (indicated by an axis B—B). When the actuator 23 is in a seek or index mode, a magnitude of the current supplied to the coil 310 will be relatively large to produce a relatively large beam member 304 displacement across one to three tracks, thus holding appropriate transducer elements opposite desired tracks. When the actuator 23 is in a track following mode, the servo loop, responding to position error signals from servo tracking elements in the head 308, makes very small, high frequency adjustments to the coil current to maintain precise transducer/track alignment.

Figure 5:
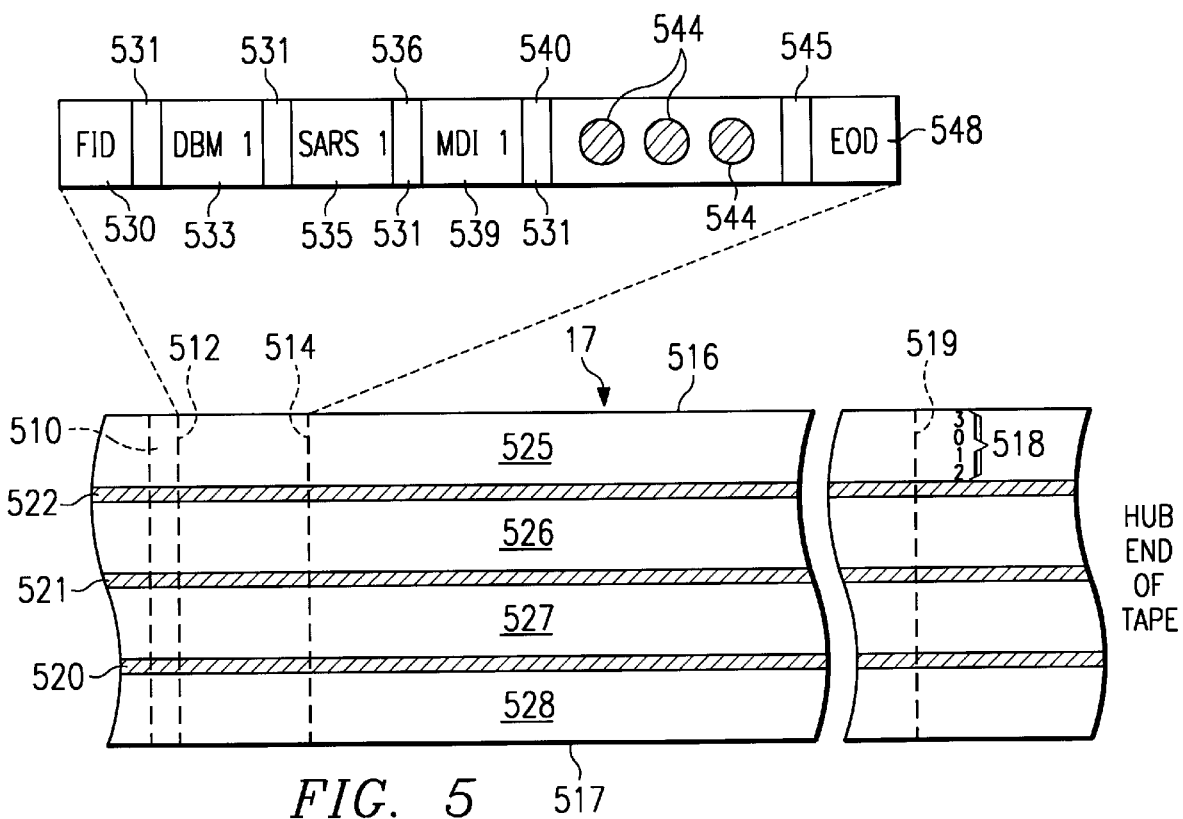
FIG. 5 is a diagram of a magnetic tape format used by the present invention.

Referring now to FIG. 5, a diagram shows the track format for the magnetic tape used in the tape system depicted in FIG. 1. The magnetic tape 17 contains three longitudinally extending servo areas 520–522 which are laterally spaced across the tape surface between its longitudinal edges 516, 517. The three servo areas 520–522 laterally partition the magnetic tape 17 into four data track areas 525–528. A calibration area is provided between dashed lines 510 and 512 at the free end of the magnetic tape, denoted by dashed line 510. This calibration area 510–512 contains signals that enable the tape drive 10 to calibrate its operation to the specific characteristics of the loaded magnetic tape 17. Data can be recorded on the remainder of the magnetic tape 17, indicated by the area between dashed lines 512 and 519. Data is serially recorded on the magnetic tape 17 in one of four track groups 518, labelled 0–3 and laterally interleaved across each of the four data track areas 525–528.

Since track group 0 518 is the logical beginning of the data recording on the magnetic tape 17, tape control information useful to the control unit 2 or the tape drive 10 may be recorded therein. Such tape control information includes data base map (DBM) 533, statistical analysis recording system (SARS) 535, and mount-demount indicator (MDI) 539. A drive partition 512–514 exists on track group 0 to record the aforementioned tape control information. This drive partition 512–514 is only addressable by the tape drive 10 and not the control unit 2. This drive partition 512–514 is accessed by moving the magnetic tape 17 to its load point (FID) 530. All other partitions on the magnetic tape 17 are addressable by the control unit 2 and sequentially numbered beginning with 0 near the free end of the tape 510. However, the drive partition 512–514 is not numbered. Each partition, whether a drive partition or an addressable partition, is a logical collection of contiguous sectors. Each partition may contain a different number of sectors. A sector is a length of magnetic tape 17 measured by a tachometer, typically located within the hub 14 of the magnetic tape 17. A specific sector can be accessed by moving the magnetic tape 17 and monitoring the count values generated by the tachometer (not shown).

The tape drive 10 may supply the control information stored in the drive partition 512–514 of the magnetic tape 17 to the control unit 2 if desired. This control information consists of information that is primarily useful to the tape drive 10 as it typically identifies physical locations on the magnetic tape 17 of control data elements which are used for locating where certain data is located on the magnetic tape 17. For example, these locations on magnetic tape, or data elements, may be referenced as partitions, logical volumes, files, or the like. The drive partition 512–514 may include a plurality of information partitions 544, each containing a block of DBM, SARS, and MDI data. Each block of data within the information partition is separated by an interblock gap (IBG) 531. An end of data (EOD) 548 control block indicates the end of the drive partition 512–514. Again, the tape drive 10, and not the control unit 2, can access the aforementioned control information in the drive partition 512–514. The tape drive 10 typically provides the control information to the control unit 2 by storing such control information temporarily in a memory (RAM).

Figure 6:
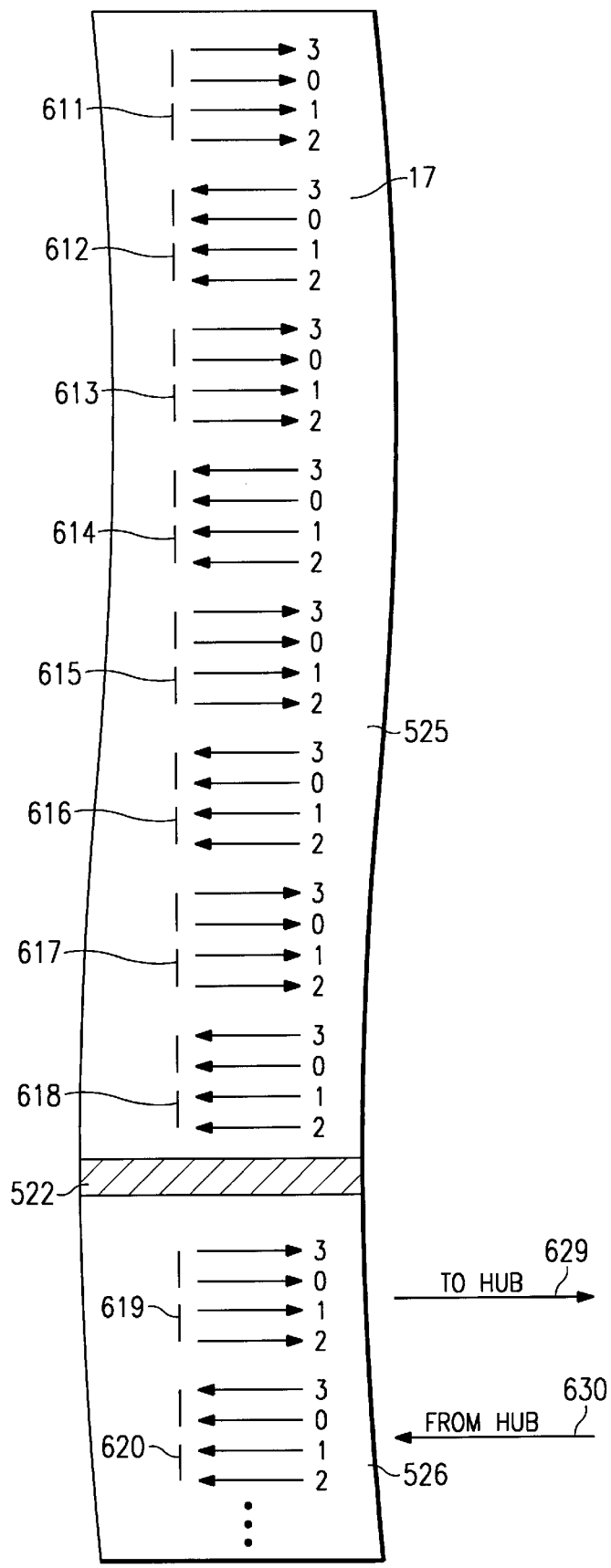
FIG. 6 is a diagram of a serpentine track accessing for the magnetic tape format illustrated in FIG. 5.

FIG. 6 illustrates a spacing of tracks across a lateral, cross-section of magnetic tape 17. Data track areas 525–526 are separated by servo area 522. The physical tracks are grouped in track clusters 611–620. Each track cluster 611–620 consists of one track from each of the four track groups 518, 0–3. Adjacent track clusters 611, 612 are scanned in opposite directions 629, 630. In this specific diagram for example, odd numbered track clusters 611, 613, 615, 617, 619 27 are scanned in a direction 629 toward the magnetic tape hub 14 while even numbered track clusters 612, 614, 616, 618, 620 are scanned in a direction 630 away from the hub 14. The "to hub" direction 629 results from reeling magnetic tape 17 from the tape cartridge 13 spool and the "from hub" direction 630 is caused by reeling magnetic tape 17 onto the tape cartridge 13 spool. Thus, the magnetic tape 17 is scanned in a serpentine manner.

Figure 7:
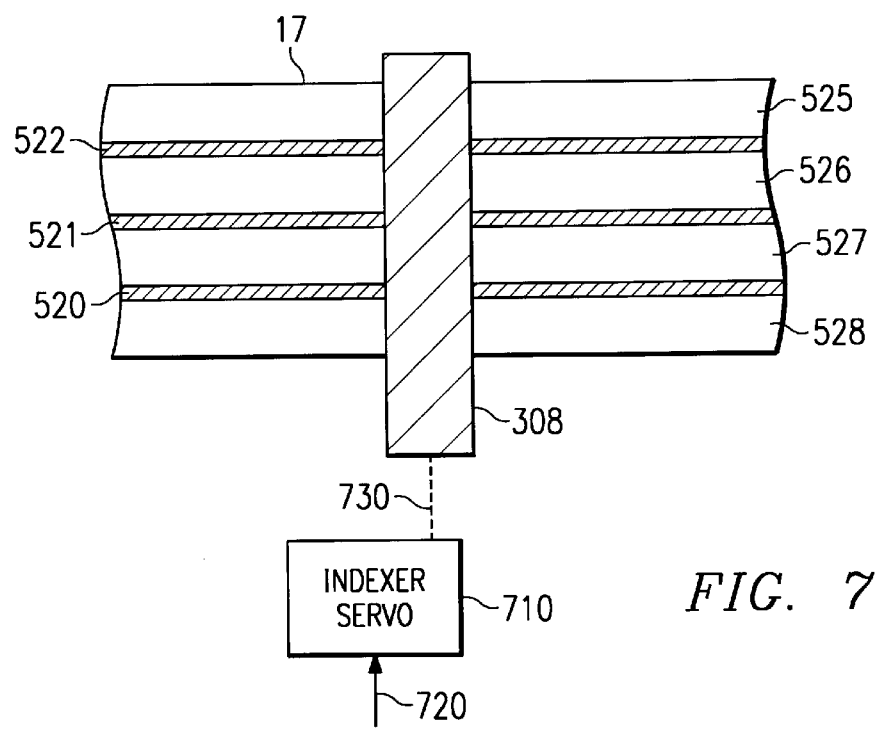
FIG. 7 is a simplified block diagram depicting a head indexing and servoing system for the tape system illustrated in FIG. 1 using the magnetic tape format shown in FIG. 5.

Referring to FIG. 7, a block diagram shows a magnetic head 308 relative to magnetic tape 17 passing beneath it. The magnetic head 308 has three sets of servo gaps that concurrently sense the three servo tracks 520–522 along the magnetic tape 17, resulting in three positional error signals (PES). These three positional error signals combine to form a servo drive signal 720 to the servo 710. The servo 710 moves the head 308 according to the servo drive signal 720 allowing the head 308 to correctly align itself laterally across the magnetic tape 17 and accurately access information stored in tracks longitudinally extending along the data track areas 525–528 of the magnetic tape 17. Dashed line 730 represents the servo 710 aligning the head 308.

FIGS. 8A–8D demonstrate how the read-write head element pairs 810, 812 within the tape head 308 laterally traverse a cross-section of magnetic tape 17 to access the distinct track groups 518 in the data track area 525. In addition, the servo element pairs 814, 816 follow along either of two servo tracks 820, 822 within a servo track area 522 keeping the tape head 308 aligned with the magnetic tape 17. As previously stated, the magnetic tape 17 travels longitudinally across the tape head 308. The servo tracks 830 allow the tape head 308, and the associated read-write 810, 812 and servo 814, 816 element pairs, to adjust laterally to the magnetic tape 17 as it travels past the tape head 308.

In FIG. 8A, the tape head 308 is accessing track group 3. Read-write element pair 810 accesses information along track group 3 when the magnetic tape 17 travels in the "to hub" direction 629 while the alternate read-write element pair 812 accesses data from the same track group when the magnetic tape 17 moves in the opposite direction 630. The servo element pair 816 situated farthest from the read-writeelement pairs 810, 812 aligns tape head 308 to the passing magnetic tape 17 by sensing the upper servo track 820 positioned within the servo track area 522. When the magnetic tape 17 laterally deviates from the tape head 308, the servo element pair 814, 816 senses such deviation and generates a position error signal. This position error signal is combined with two additional position error signals corresponding to the two other servo areas of the magnetic tape 17. A servo drive signal 720 is then generated from these combined position error signals to laterally adjust the tape head 308 to the passing magnetic tape 17.

Correspondingly, the tape head 308 can access information from tracks in track groups 0–2 as shown in FIGS. 8B–8D. In FIG. 8B, the read-write element pairs 810, 812 access information along track group 0 according to which direction 629, 630 the magnetic tape 17 travels past the tape head 308. The servo element pair 816 situated farthest from the read-write element pairs 810, 812 aligns tape head 308 to the passing magnetic tape 17 by sensing the lower servo track 822. In FIG. 8C, read-write element pairs 810, 812 can access information along track group 1 depending on which direction 629, 630 the magnetic tape 17 travels past the tape head 308. The servo element pair 814 situated closest to the read-write element pairs 810, 812 aligns tape head 308 to the passing magnetic tape 17 by sensing the upper servo track 820. Finally, FIG. 8D shows that read-write element pairs 810, 812 access track group 2 while the servo element pair 814 situated closest to the read-write element pairs 810, 812 aligns tape head 308 to the passing magnetic tape 17 by sensing the lower servo track 822.

Figure 9:
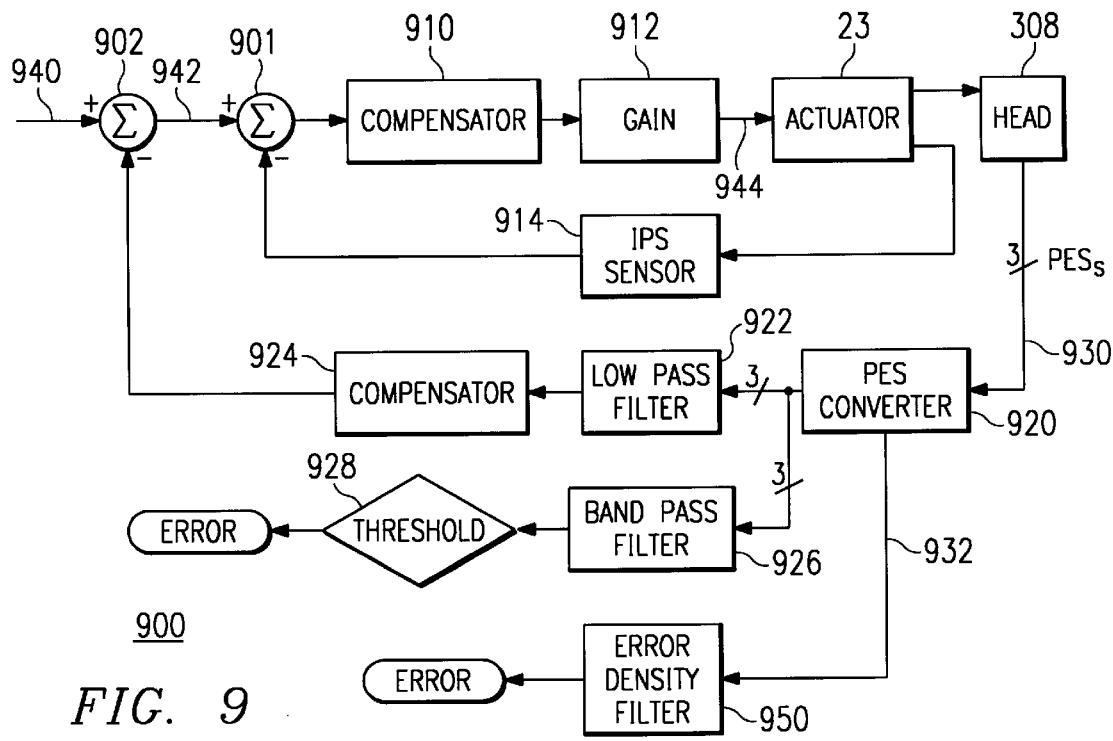
FIG. 9 is a block diagram of the servo system of the present invention used for aligning a tape head along a magnetic tape.

FIG. 9 shows a block diagram of the servo system 900 embodied in the present invention. As stated earlier, the servo system 900 laterally adjusts the tape head 308 to a passing magnetic tape 17 such that the read-white element pairs 810, 812 can access information stored longitudinally in tracks on the magnetic tape 17. As depicted in FIG. 9, the servo system 900 contains inner 901 and an outer 902 feedback loops. The inner feedback loop 901 positions the tape head 308 relative to the frame, or casing, of the tape drive 10. Correspondingly, the outer feedback loop 902 aligns the tape head 10 to minor lateral movements by the passing magnetic tape 17 relative to the tape head 308.

The inner feedback loop 901 includes a compensator 910, a gain circuit 912, the actuator 23 to the tape head 308, and an independent position sensor (IPS) 914. Typically, the IPS 914 is an optical sensor which detects movements of the tape head 308 relative to the frame of the tape drive 10. The compensator 910 and gain 912 circuits simply alter the phase and the gain of the signal into the actuator 23 and are well-known in the art. As described earlier, the actuator 23 produces the signals to physically position the tape head 308. In operation, the independent position sensor 914 detects when the tape head 308 needs to be adjusted relative to the frame of the tape drive 10. The IPS 914 sends a feedback signal component to the requested head position signal 942 to adjust the tape head 308 relative to the frame of the tape drive 10. The compensator 910 and gain 912 circuits adjust the phase and strength of the combined tape position signal 944 to be received as input to the actuator 23. The actuator 23 then controls and or adjusts the position of the tape head 308.

The outer feedback loop 902 includes the compensator 910 and gain 912 circuits and the actuator 23 of the inner feedback loop 901 in its forward path. In addition, the outer feedback loop 902 contains the three position error signals (PES) 930 generated from the three servo track areas 520–522, a PES converter 920, a low-pass filter 922, and a compensator 924 in its feedback path. As stated earlier, three servo element pairs within the tape head 308 follow three servo track areas 520–522 longitudinally placed upon the magnetic tape 17 and generate three position error signals 930 corresponding to any needed lateral adjustments of the tape head 308 to the passing magnetic tape 17. The PES converter 920 checks the veracity of each of the three generated position error signals 930. The three signals are checked to ensure that the current amplitude is within a minimum and maximum range and the amplitude difference, or delta, from the previous signal sample does not exceed a certain limit.

The position error signals 930 consist of three components: a low (less than 100 Hz), midrange (between 100 Hz and 450 Hz), and high (greater than 450 Hz) frequency component. The low frequency portion of the position error signal 930 results from lateral movement of the magnetic tape 17 during normal operation. The midrange frequency component typically results from tape edge vibration and distortion from the magnetic tape 17. Finally, the high frequency component consists solely of noise and carries no useful information regarding the lateral positioning of the tape head 308 to the magnetic tape 17. Thus, the high frequency and midrange frequency components should ideally be removed from the position error signal 930 when feeding it back to the initial desired tape position signal 940.

The three position error signals 930 are filtered using a low-pass filter 922 removing both the high frequency, noisy signal content and the midrange frequency content. The three signals 930 are sampled individually, summed together, and averaged in the filter 922 to obtain a single low frequency output which corresponds to the lateral position adjustment of the tape head 308 relative to the magnetic tape 17. This filtering is distinguished from normal low-pass filtering preferred in the art, where each signal is low-passed filtered separately and the individual filtered signals are then combined to form the overall filtered signal. The filter 922 of the present invention gives more weight to a group of position error signals 930 that resemble each other in phase and amplitude than a group of signals having no resemblance. Whereas, the filtering techniques in current art do not provide this result. Finally, the output signal from the low-pass filter 922 is adjusted for phase and gain through the compensator 924 and combined with the initial desired position signal 940 at the end of the feedback path of the outer loop 902.

A band-pass filter 926 and a threshold detector 928 provides one form of error detection within the servo system 900. As stated earlier, position error signal 930 components within the midrange frequencies (100 Hz to 4500 Hz) are often attributed to distortion and tape edge vibration of the magnetic tape 17. Whereas these signal components are not used to laterally align the tape head 308 to the magnetic tape 17, the midrange frequency components are used in the present invention to detect tape distortion and tape edge vibration type errors. The three position error signals 930 are filtered through the band-pass filter 926 resulting in a single error signal. The output from the band-pass filter 926 is then compared to a specified threshold 928. If the output exceeds the threshold 928, an error of this type is flagged.

A error density filter 950 provides detection of a second type of errors, such as surface defects along the magnetic tape 17. The position reliability signals 932 generated in the PES converter 920 are processed through the error density filter 950. As previously stated, the PES converter 920 generates a position reliability signal 932 by checking the amplitude of the position error signal against a minimum and maximum range and differential threshold. If the amplitude exceeds the range or the threshold, a veracity error (or 1) is set in the position reliability signal 932. Otherwise, the position reliability signal is set to indicate no error (0). The position reliability signals 932 are then summed to calculate an overall error density. This error density is then compared to a specified threshold to determine if a surface error exists on the magnetic tape 17.

Figure 10:
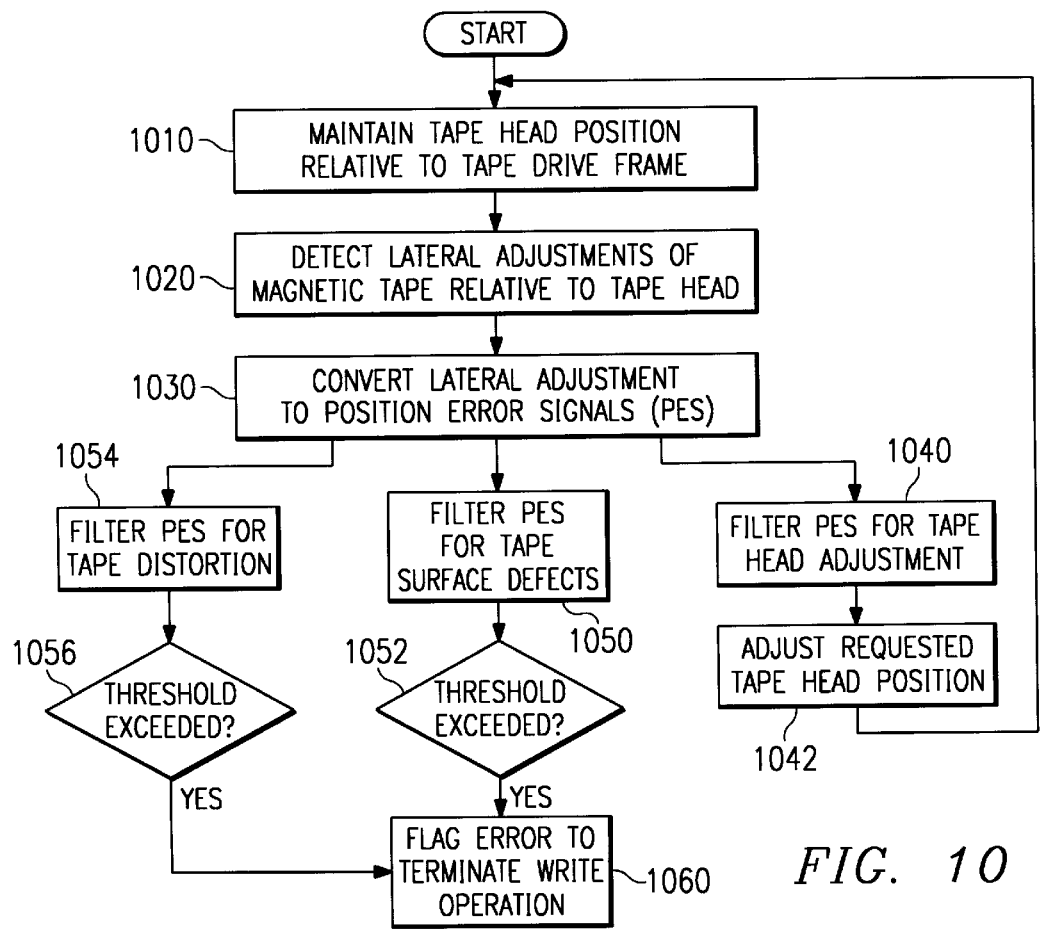
FIG. 10 is a block diagram illustrating the method in the present invention for servo-controlling the tape head along the magnetic tape.

FIG. 10 includes a block diagram showing the method of servo controlling the tape head 308 in the present invention. To correctly process information on a magnetic tape 17, the read-write element pairs 810, 812 contained within the tape head 308 must remain aligned with the longitudinal tracks 525 of the magnetic tape 17. Movements of the tape drive 10 frame and lateral slippage of the magnetic tape 17 may cause misalignment of the tape head 308. At step 1010, the position of the tape head 308 is kept fixed relative to the tape drive 10 frame. A positional sensor detects any movements of the tape drive 10 frame and signals the head actuator 23 to correspondingly position the tape head 308. At step 1020, servo element pairs 814, 816 within the tape head 308 detect any lateral adjustments of the magnetic tape 17 as it travels by the tape head 308. At step 1030, the lateral positional adjustment detected in step 1020 is converted into position error signals (PES) 930. The position error signals 930 are then filtered in step 1040 to keep the portion of the signal attributed to the movement of the magnetic tape 17, the portion of the signal used for adjustment of the tape head 308 position. This filtering step 1040 removes the high frequency noise and midrange frequency components from the position error signal 930. At step 1042, the requested head position 942 is adjusted according to the filtered position error signal from step 1040.

The position error signal 930 is also filtered in step 1054 to retain possible information about tape edge vibration and distortion along the magnetic tape 17. This filtering step 1054 differs from step 1040 in that it removes the high frequency noise but keeps the midrange frequency portion of the signal. The amplitude of the remaining midrange frequency signal is then compared to a threshold at step 1056 to determine if an error exists. If the threshold is exceeded, step 1060 flags an error to terminate any current write operations to the magnetic tape 17.

At step 1050, the position error signals 930 are filtered to determine whether surface defects exist along the magnetic tape 17. The filtering in step 1050 generates a position reliability signal 932 that indicates the veracity of the position error signal 930. If the amplitude of the position error signal 930 is not within a certain minimum and maximum range or if the difference between the current position error signal 930 and the preceding stored signal is greater than a specified amount, the veracity of the position error signal 930 is suspect and a position reliability signal 932 indicating an error (1) is generated. Otherwise, a position reliability signal 932 indicating no error (0) is set. An error density is calculated by summing all the sampled position reliability signals 932 stored in the error density filter 950. At step 1052, the error density is compared to a specified threshold to determine if a surface error exists on the magnetic tape 17. If the error density exceeds the threshold, step 1060 flags an error to terminate any current write operations on the magnetic tape 17.

Figure 11:
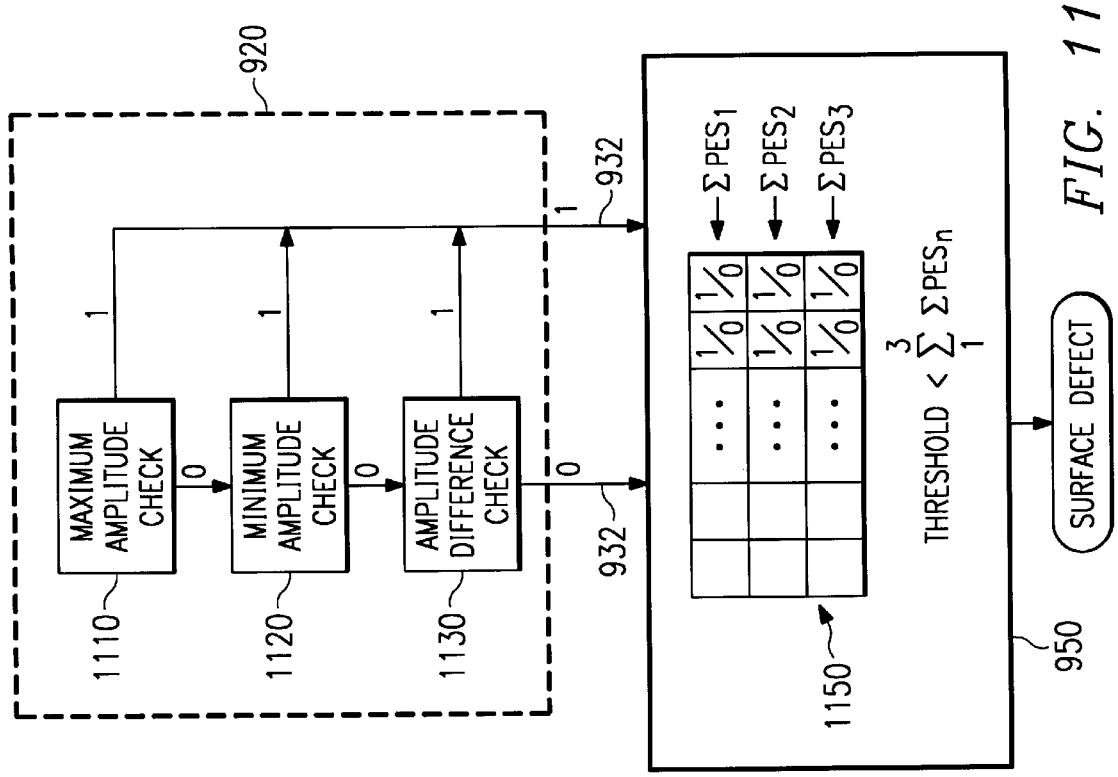
FIG. 11 shows a more detailed block diagram of the error detection mechanism of the servo system of the present invention.

FIG. 11 shows a more detailed block diagram of the error density filter in the present invention. An effective servo system must detect defective areas along the surface of the magnetic tape 17, such as dropout or debris. As previously stated, three servo element pairs 814, 816 contained within the tape head 308 trace along three servo track areas 520–522 within the magnetic tape 17 surface generating three position error signals 930. As stated earlier, the PES converter 920 generates a position reliability signal 932 for each position error signal 930. At block 1110 within the PES converter 920, the amplitude of each position error signal 930 is checked against a specified maximum amplitude. A position reliability signal 1160 indicating an error (or 1) is generated only when the maximum amplitude is exceeded. Likewise, the three position error signals 930 are compared to a minimum amplitude at block 1120. If the minimum is not reached, a position reliability signal 1160 indicating an error (or 1) is set. Otherwise, no error (or 0) is indicated. At block 1130, a differential amplitude is calculated for each of the three position error signals 930. An error (1) or non-error (0) position reliability signal 1160 is set whether the differential amplitude exceeds a specified threshold.

At block 1140, the three position reliability signals 932 are stored within an array 1150. The array 1150 contains the twelve values of each position reliability signal corresponding to each servo track area 520–522. Thus, the array 1150 consists of three rows, each row having twelve columns. Each row corresponds to the sampled position reliability signals 932 for one of the servo track areas 520–522 along the magnetic tape 17. Accordingly, each column represents the position reliability signals 932 corresponding to a particular cross-section of the magnetic tape. When summing the values stored in each row of the array 1150, the condition of the magnetic tape 17 surface longitudinally extending along each servo track area 520–522 can be determined. The error density filter 950 calculates an error density value by summing the thirty-six position reliability signal 932 values stored in the array 1150. This error density value is then compared to a specified threshold to determine if the section of tape associated with these position signal values contains surface defects. In calculating the error density, a sum is first computed of the twelve position reliability signal 932 values in each row. If any row sum exceeds a particular threshold for the row, a single track failure is detected. When a single track failure occurs, the overall threshold is adjusted upward before comparing with the error density. In this way, the error density filter 950 makes an allowance for single track failures before determining whether the magnetic tape 17 contains surface errors. Thus, positional information regarding the passing magnetic tape 17 can still be used in the case where one servo track 520 provides unreliable signals but the remaining two servo areas 521, 522 provide reliable position error signals 930.

While the invention has been particularly shown and described with reference to preferred embodiments thereof, it will be understood by those skilled in the art that various changes in form and details may be made therein without departing from the spirit and scope of the invention.

What is claimed is:

1. In a tape drive having a frame, a tape head for accessing data on a magnetic tape, and an actuator for positioning said tape head, said tape head having read elements for reading data from said magnetic tape, write elements for writing data to said magnetic tape, and servo elements for detecting a lateral position of said tape head relative to said magnetic tape, a method for servo controlling said tape head such that said tape head remains aligned with said magnetic tape comprising steps of:

sensing a position of said tape head relative to said frame of said tape drive to allow said actuator to adjust said tape head to movements of said frame;

magnetically detecting a lateral position adjustment of said magnetic tape relative to said servo element of said tape head as said magnetic tape longitudinally travels past said tape head;

converting said lateral position adjustment into a plurality of position error signals;

first filtering said plurality of position error signals to generate a filtered position error signal;

second filtering said plurality of position error signals to calculate an error density, said error density computed by veracity checking a current time sample of position error signals to generate a current time sample of position reliability signals and adding said current time sample of position reliability signals to previously sampled position reliability signals;

laterally positioning said tape head with said actuator according to said filtered position error signal; and comparing said error density with a surface threshold to determine whether a surface defect exists on said magnetic tape.

2. The method in claim 1 further comprising:
third filtering said plurality of position error signals to generate a midrange frequency signal; and
comparing said midrange frequency signal with a distortion threshold to detect whether a tape distortion or a tape edge vibration error exists on said magnetic tape.

3. The method in claim 2 further comprising terminating a write access on said magnetic tape when either said surface defect or said tape distortion or said tape edge vibration error is detected.

4. The method in claim 2 wherein said third filtering step comprises band-pass filtering.

5. The method in claim 1 wherein said second filtering step includes a matrix having r rows and n columns to compute said error density, such that each row corresponds to one of said plurality of position error signals and each column corresponds to a time sample of said position reliability signals.

6. The method in claim 1 wherein said veracity checking further comprises verifying that an amplitude of each one of said plurality of position error signals is within a minimum and maximum amplitude range and a specified amplitude differential.

7. The method in claim 1 wherein said first filtering step comprises low-pass filtering said plurality of position error signals to generate said filtered position error signal having only low frequency signal components.

8. The method in claim 7 wherein said first filtering step further comprises:
combining said plurality of position error signals; and
averaging said combination of position error signals to 1generate said filtered position error signal having only low frequency signal components.

9. In a tape drive having a frame, a tape head for accessing data on a magnetic tape, and an actuator for positioning said tape head, said tape head having read elements for reading data from said magnetic tape and write elements for writing data to said magnetic tape, a servo system for controlling said tape head such that said tape head remains aligned with said magnetic tape comprising:
a position sensor connected to said frame for maintaining a position of said tape head relative to said frame of said tape drive, said position sensor allowing said actuator to adjust said tape head to any movements of said frame;
a plurality of servo elements within said tape head for detecting a lateral position adjustment of said magnetic tape relative to said tape head as said magnetic tape longitudinally travels past said tape head, said plurality of servo elements converting said lateral position adjustment into a plurality of position error signals;
a first filter to generate a filtered position error signal from said plurality of position error signals, said filtered position error signal used by said actuator to laterally position said tape head; and
a second filter to calculate an error density, said error density computed by veracity checking a current time sample of position error signals to generate a current time sample of position reliability signals and adding said current time sample of position reliability signals to previously sampled position reliability signals, said error density then compared to a surface threshold to determine whether a surface defect exists on said magnetic tape.

10. The servo system in claim 9 further comprising:
a third filter to generate a midrange frequency signal from said plurality of position error signals; and
wherein said midrange frequency signal is compared to a distortion threshold to detect whether a tape distortion or a tape edge vibration error exists on said magnetic tape.

11. The servo system in claim 10 wherein a write operation on said magnetic tape is terminated when either said surface defect or said tape distortion or said tape edge vibration error is detected.

12. The servo system in claim 11 wherein said second filter further comprises:
a converter for generating said current time sample of position reliability signals;
a matrix having r rows and n columns, each row corresponds to one of said plurality of position error signals and each column corresponds to a time sample of said position reliability signals; and
an adder to compute a sum of said plurality of position reliability signals for calculating said error density.

13. The servo system in claim 12 wherein said converter further comprises a means for verifying that an amplitude of each one of said plurality of position error signals is within a minimum and maximum amplitude range and a specified amplitude differential.

14. The servo system in claim 10 wherein said third filter is a band-pass filter.

15. The servo system in claim 9 wherein said first filter is a low-pass filter to generate said filtered position error signal having only low frequency signal components from said plurality of position error signals.

16. The servo system in claim 15 wherein said first filter further comprises:
a means for combining said plurality of position error signals; and
a means for averaging said combination of position error signals to generate said filtered position error signal having only low frequency signal components.

17. A tape drive for reading information from and writing information to a magnetic tape comprising:
a tape head for accessing information on said magnetic tape;
a frame for reducing resonances to said tape head;
an actuator for positioning said tape head;
a motion control system for servoing said tape head relative to said magnetic tape further comprising:
a position sensor connected to said frame for maintaining a position of said tape head relative to said frame of said tape drive, said position sensor allowing said actuator to adjust said tape head to any movements of said frame;
a plurality of servo elements within said tape head for detecting a lateral position adjustment of said magnetic tape relative to said tape head as said magnetic tape longitudinally travels past said tape head, said plurality of servo elements converting said lateral position adjustment into a plurality of position error signals;
a first filter to generate a filtered position error signal from said plurality of position error signals, said filtered position error signal used by said actuator to laterally position said tape head;
a second filter to calculate an error density, said error density computed by veracity checking a current time sample of position error signals to generate a current time sample of position reliability signals and adding said current time sample of position reliability signals to previously sampled position reliability signals, said error density compared to a threshold to determine whether a surface defect exists on said magnetic tape; and a third filter to generate a midrange frequency signal from said plurality of position error signals, said midrange frequency signal compared to a distortion threshold to detect whether a tape distortion or a tape end vibration error exists on said magnetic tape, wherein a write operation on said magnetic tape is terminated when either said surface defect or said tape distortion or said tape end vibration error is detected.

18. The tape drive in claim 17 wherein said second filter of said motion control system further comprises:

a converter for generating said current time sample of position reliability signals from said plurality of position error signals, said converter verifying that an amplitude of each one of said plurality of position error signals is within a minimum and maximum amplitude range and a specified amplitude differential;

a matrix having r rows and n columns, each row corresponds to one of said plurality of position error signals and each column corresponds to a time sample of said position reliability signals; and an adder to compute a sum of said plurality of position reliability signals for calculating said error density.

19. The tape drive in claim 18 further comprising a data control circuit for sending data to and receiving data from said magnetic tape head.

* * * * *